(12) United States Patent
Morris (10) Patent No.: US 7,650,282 B1
(45) Date of Patent: Jan. 19, 2010

(54) WORD SPOTTING SCORE NORMALIZATION

(75) Inventor: Robert W. Morris, Atlanta, GA (US)

(73) Assignee: Nexidia Inc., Atlanta, GA (US)

( * ) Notice: Subject to any disclaimer, the term of this patent is extended or adjusted under 35 U.S.C. 154(b) by 615 days.

(21) Appl. No.: 10/897,155

(22) Filed: Jul. 22, 2004

Related U.S. Application Data (60) Provisional application No. 60/489,390, filed on Jul. 23, 2003.

(51) Int. Cl.
```
G10L 15/14      (2006.01)
G10L 15/04      (2006.01)
H04M 1/64       (2006.01)
H04M 11/00      (2006.01)
```

(52) U.S. Cl. .................. 704/256.1; 704/251; 379/88.01; 379/93.37

(58) Field of Classification Search .................. 704/231, 704/236–275, E17.001–E17.004, E17.007–E17.012, 704/E17.014, E15.001–E15.05; 455/415, 455/550.1–553.1; 379/88.01–88.28, 93.01–93.12, 379/93.26–93.37, 406.1–406.16
See application file for complete search history.

(56) References Cited

U.S. PATENT DOCUMENTS

| | | | | |
|---|---|---|---|---|
| 4,227,177 A | * | 10/1980 | Moshier | 704/231 |
| 4,903,305 A | * | 2/1990 | Gillick et al. | 704/245 |
| 4,977,599 A | * | 12/1990 | Bahl et al. | 704/256.4 |
| 5,440,662 A | * | 8/1995 | Sukkar | 704/236 |
| 5,572,624 A | * | 11/1996 | Sejnoha | 704/256.2 |
| 5,625,748 A | * | 4/1997 | McDonough et al. | 704/251 |
| 5,749,069 A | * | 5/1998 | Komori et al. | 704/240 |
| 5,842,163 A | * | 11/1998 | Weintraub | 704/240 |
| 5,893,058 A | * | 4/1999 | Kosaka | 704/254 |
| 5,937,384 A | * | 8/1999 | Huang et al. | 704/256 |
| 6,038,535 A | * | 3/2000 | Campbell | 704/275 |
| 6,539,353 B1 | | 3/2003 | Jiang et al. | |
| 2002/0026309 A1 | * | 2/2002 | Rajan | 704/200.1 |
| 2002/0161581 A1 | | 10/2002 | Morin | |
| 2004/0167893 A1 | * | 8/2004 | Matsunaga et al. | 707/6 |
| 2004/0215449 A1 | * | 10/2004 | Roy | 704/211 |
| 2006/0074666 A1 | * | 4/2006 | Chung | 704/257 |
| 2006/0212295 A1 | * | 9/2006 | Wasserblat et al. | 704/252 |

OTHER PUBLICATIONS

C. D. Manning, et al., Foundations of Statistical Natural Language Processing. The MIT Press, 1999.*
Rabiner, Lawrence R. "A Tutorial on Hidden Markov Models and Selected Applications in Speech Recognition." Proceedings of the IEEE, vol. 77, No. 2, Feb. 1989.*

\* cited by examiner

*Primary Examiner*—Talivaldis I Smits
*Assistant Examiner*—David Kovacek
(74) *Attorney, Agent, or Firm*—Occhiuti Rohlicek & Tsao LLP

(57) ABSTRACT

An approach to scoring acoustically-based events, such as hypothesized instances of keywords, in a speech processing system make use of scores of individual components of the event. Data characterizing an instance of an event are first accepted. This data includes a score for the event. The event is associated with a number of component events from a set of component events, such as a set of phonemes. Probability models are also accepted for component scores associated with each of the set of component events in each of two of more possible classes of the event, such as a class of true occurrences of the event and a class of false detections of the event. The event is then scored. This scoring includes computing a probability of one of the two or more possible classes for the event using the accepted probability models.

13 Claims, 9 Drawing Sheets

300  Function gibbs_sample ($Q$, $R$, *num_iter*, *num_em*)

310    $\left(\hat{\mu}^{(1)}, \hat{\sigma}^{(1)}\right) =$ em_iterate $(Q, R, num\_em)$ 320    for i = 2, ..., *num_iter*

330      $\tilde{r} =$ sample_factor $(Q, R, \hat{\mu}^{(i-1)}, \hat{\sigma}^{(i-1)})$ 340      $\hat{\mu}^{(i)} =$ sample_mean $(Q, \tilde{r}, \hat{\sigma}^{(i-1)})$ 350      $\hat{\sigma}^{(i)} =$ sample_sig $(Q, \tilde{r}, \hat{\mu}^{(i)})$ 360    return $(\hat{\mu}^{(num\_iter)}, \hat{\sigma}^{(num\_iter)})$

*FIG. 3*

400  Function em_iterate (*Q, R, num_iter*)

410  $(\mu^{(o)}, \sigma^{(o)}) = $ initialize_iter$(Q, R)$ 420  for $i = 1, \ldots, num\_iter$ 430  $(\overline{r1}, \overline{r2}) = $ expect_factor $(Q, R, \mu^{(i-1)}, \sigma^{(i-1)})$ 440  $(\mu^{(i)}, \sigma^{(i)}) = $ maximize_like$(Q, \overline{r1}, \overline{r2})$ 450  return $(\mu^{(num\_iter)}, \sigma^{(num\_iter)})$

*FIG. 4*

500   Function expected_factor $(Q, R, \mu, \sigma)$ 510         for each query $q$ 520         $\overline{r1}^{(q)} = \mathrm{E}\,(r^{(q)} | R^{(q)}, \mu, \sigma)$ 530         $\overline{r2}^{(q)} = \mathrm{E}\,(r^{(q)^2} | R^{(q)}, \mu, \sigma)$ 540         return $(\ \{\overline{r1}^{(q)}\}, \{\overline{r2}^{(q)}\}\ )$

*FIG. 5*

600    Function maximize_like $(Q, r1, r2)$ 610    for $K = 1, \ldots, L$

620    $$accum1[K] = \sum_{q \in Q} \sum_{\substack{i=1 \\ S_i^{(q)} = K}}^{N^{(q)}} r1_i^{(q)}$$

630    $$accum2[K] = \sum_{q \in Q} \sum_{\substack{i=1 \\ S_i^{(q)} = K}}^{N^{(q)}} r2_i^{(q)}$$

640    $$count[K] = \sum_{q \in Q} \#(S_i^{(q)} = K)$$

650    $\hat{\mu}_K = accum1[K] / count[K]$ 660    end

670    $$\hat{\sigma} = \left( \frac{\sum_K (accum2[K] - count[K]\hat{\mu}_K^2)}{\sum_K count[K]} \right)^{1/2}$$

680    return $(\hat{\mu} = (\hat{\mu}_1, \ldots \hat{\mu}_L)^T, \hat{\sigma})$

*FIG. 6*

700    Function sample_factor ($Q, R, \mu, \sigma$)

730        for each query $q \in Q$

740            draw $\tilde{r}^{(q)}$ at random from the distribution $P(r^{(q)} | R^{(q)}, \mu, \sigma)$ 750        return $\tilde{r}$ 760    end

FIG. 7

800   Function sample_mean $(Q, \tilde{r}, \sigma)$ 810       for $k=1,\ldots,L$ 820       $$accum[k] = \sum_{\text{query } q} \sum_{\substack{i:1 \\ S_i^{(q)}=k}}^{N^{(q)}} \tilde{r}_i^{(q)}$$

830       $$count[k] = \sum_{\text{query } Q} \#(S_i^{(q)} = k$$

840       $$\hat{\mu}_k = \frac{accum[k]}{count[k]}$$

850       $$\hat{\sigma}_{uk} = \sigma / count[k]$$

860       draw $\tilde{\mu}_k$ at random from the distribution $N(\hat{\mu}_k, \hat{\sigma}^2{}_{\mu_k})$ 870       return $\tilde{\mu} = (\tilde{\mu}_1, \ldots \tilde{\mu}_L)^T$

*FIG. 8*

900   function sample_sig $(Q,\tilde{r},\mu)$

910   $accum = \sum\limits_{\text{query } q} \sum\limits_{i=1}^{N^{(q)}} (\tilde{r}_i^{(q)} - \mu_{S_i^{(q)}})^2$ 920   $count = \sum\limits_{\text{query } q} N^{(q)}$ 930   draw $\tilde{\sigma}$ at random from the inverted gamma distribution IG (*count*/2, *accum*/2)

940   return $\tilde{\sigma}$

*FIG. 9*

WORD SPOTTING SCORE NORMALIZATION

CROSS-REFERENCE TO RELATED APPLICATIONS

This application claims the benefit of U.S. Provisional Application No. 60/489,390 filed Jul. 23, 2003, which is incorporated herein by reference.

BACKGROUND

This invention relates to scoring of acoustically-based events in a word spotting system.

Word spotting systems are used to detect the presence of specified keywords or phases or other linguistic events in an acoustically-based signal. Many word spotting systems provide a score associated with each detection. Such scores can be useful for characterizing which detections are more likely to correspond to a true events ("hits") rather than misses, which are sometimes referred to as false alarms.

Some word spotting systems make use of statistical models, such as Hidden Markov Models (HMMs), which are trained based on a training corpus of speech. In such systems, probabilistically motivated scores have been used to characterize the detections. One such score is a posterior probability (or equivalently a logarithm of the posterior probability) that occurred (e.g., started, ended) at a particular time given acoustically-based signal and the HMM model for the keyword of interest and for other speech.

It has been observed that the probabilistically motivated scores can be variable, depending on factors such as the audio conditions and the specific word or phrase that is being detected. For example, scores obtained in different audio conditions or for different words and phrases are not necessarily comparable.

SUMMARY

In one aspect, in general, the invention features a method and corresponding software and a system for scoring acoustically-based events in a speech processing system. Data characterizing an instance of an event are first accepted. This data includes a score for the event. The event is associated with a number of component events from a set of component events. Probability models are also accepted for component scores associated with each of the set of component events in each of two of more possible classes of the event. The event is then scored. This scoring includes computing a probability of one of the two or more possible classes for the event using the accepted probability models.

Aspects of the invention can include one or more of the following features:

The two or more classes of the event can include true occurrence of the event, and the classes can include false detection of the event.

The acoustically-based event can include a linguistically-defined event, which can include one or more word events. The component events can include subword units, such as phonemes.

The probability models for the component scores can be Gaussian models.

The method can further include accepting data characterizing multiple instances of events, such that at least some of the events are known to belong to each of the two or more classes of events. The method can further include estimating parameters for the probability models for the component scores from the data characterizing the multiple instances of events. Estimating the parameters can include applying a Gibbs sampling approach.

Aspects of the invention can have one or more of the following advantages.

The approach can make scores for different events, which may have different phonetic content, more comparable.

The overall accuracy of a word spotting system can be improved using this approach.

Other features and advantages of the invention are apparent from the following description, and from the claims.

DESCRIPTION

Figure 1:
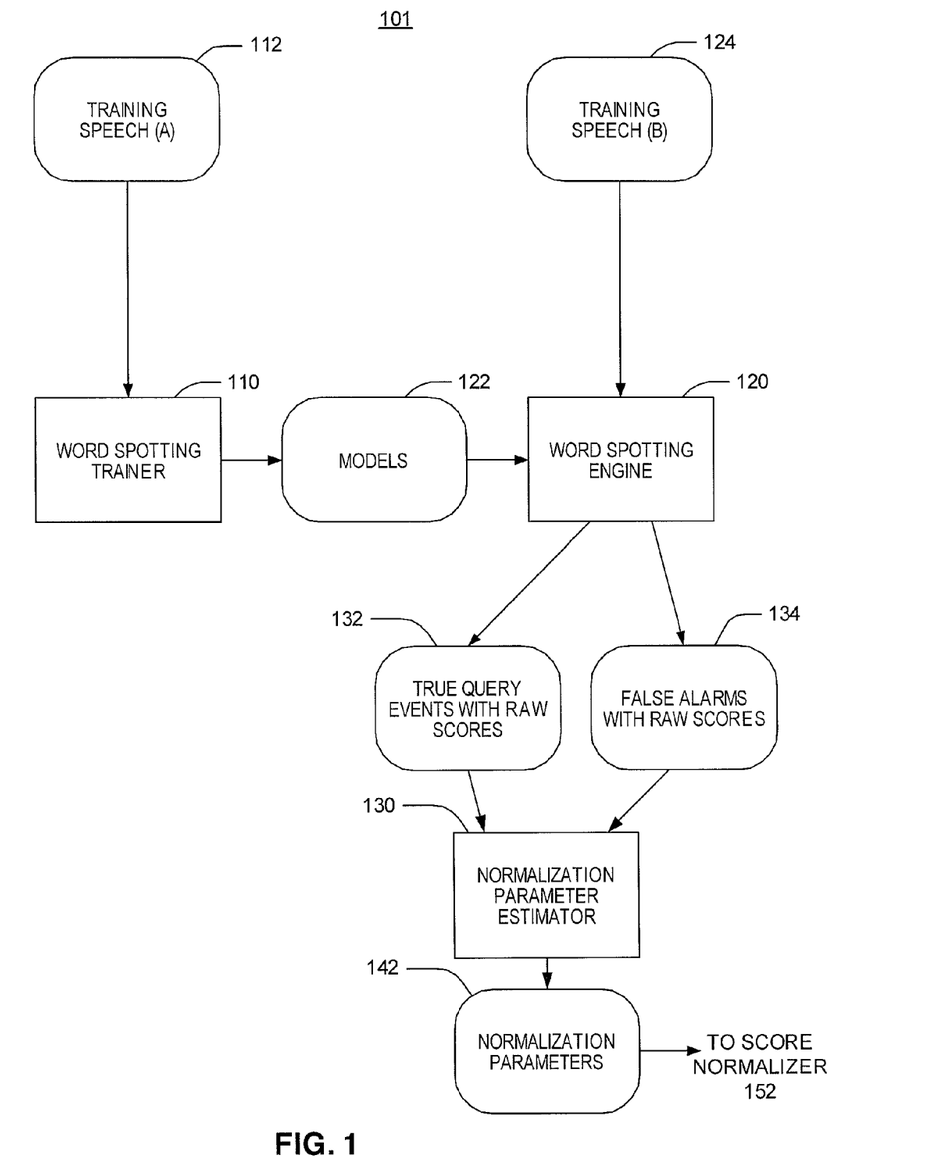
FIG. 1 is a block diagram of training components of a word spotting system.
Figure 2:
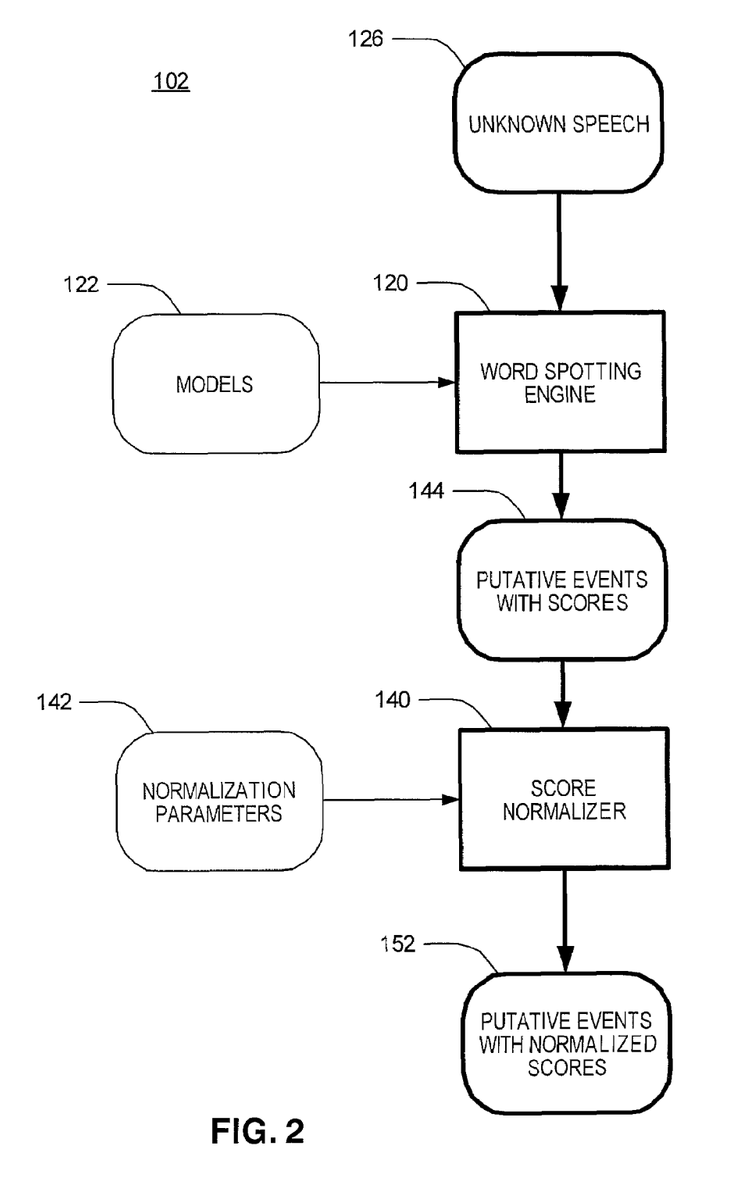
FIG. 2 is a block diagram of runtime components of a word spotting system.

Referring to FIGS. 1 and 2, a word spotting system includes a training subsystem 101 (FIG. 1), which includes components that are used during a training or parameter estimation phase, and a runtime subsystem 102 (FIG. 2), which includes components that are used during processing of unknown speech 126. (The speech is "unknown" in that the locations of desired events are not known.)

Referring first to the runtime subsystem 102, which is shown in FIG. 2, a word spotting engine 120 accepts the unknown speech 126 as input and produces putative detections 144 of one or more words, phrases, or other linguistic events which are specified by corresponding queries. Each putative detection of an event is associated with a score that is calculated by the word spotting engine 120. The word spotting engine 120 is configured with models 122 that are computed by the training subsystem 101, which is described further below. The models 122 includes statistically estimated parameters for analytic probabilistics models for linguistically-based subword units. In this version of the system, these units include approximately 40 English phonemes. The statistical models for these units are represented using Hidden Markov Models (HMMs).

The word spotting engine 120 processes the unknown speech 126 to detect instances of the events specified by the queries. These detections are termed putative events 144. Each putative event is associate a score and the identity of the query that was detected, as well as an indication of when the putative event occurred in the unknown speech (e.g., a start time and/or an end time). In this version of the system, the score associated with a putative event is a probability that the event started at the indicated time conditioned on the entire unknown speech signal 126 and based on the models 122. These scores that are output from the word spotting engine 120 are referred to below as "raw scores."

The raw scores for the putative events 144 are processed by a score normalizer 140 to produce putative events with normalized scores 152. The score normalizer 140 makes use of normalization parameters 142, which are determined by the training subsystem 101. Generally, the score normalizer 140 uses the phonetic content of a query and the normalization parameters that are associated with that phonetic content to map the raw score for the query to a normalized score. The normalized score can be interpreted as a probability that the putative event is a true detection of the query. The normalization score is a number between 0.0 and 1.0 with a larger number being associated with a greater certainty that the putative event is a true detection of the query.

Referring to FIG. 1, the models 122 that are used by the word spotting engine 120 are estimated by a word spotting trainer 110 from training speech (A) 112 using conventional HMM parameter estimation techniques, for example, using the well-known Forward-Backward algorithm.

The normalization parameters 142 are estimated by a normalization parameter estimator 130. This parameter estimator takes as inputs a set of true instances of query events along with their associated raw scores 132, as well as a set of false alarms and their scores 134, that were produced by the word spotting engine 120 when run on training speech (B) 124. These sets of true events and false alarms include instances associated with a number of different queries, which together provide a sampling of the subword units used to represent the queries. Preferably, training speech (A) 112, which is used to estimate models 122, and training speech (B) 124 are different, although the procedure can be carried out with the same training speech, optionally using one of a variety of statistical jackknifing techniques with the same speech.

The normalization parameter estimator 130 and the associated score normalizer 140 are based on a probabilistic model that treats each raw score, $R^{(q)}$, for an instance of a putative detection of a query q expressed as a logarithm of a probability that the query q occurred, as having an additive form that includes terms each associated with a different subword (phonetic) unit of a query. That is, if the query q is represented as the sequence of N units $s_1, \ldots, s_N$, (the dependence of the length N on the specific query q is omitted in the notation below to simplify the notation) then the raw score is represented as $R^{(q)} = \sum_{i=1}^{N} r_{s_i}$. The component scores $r_{s_i}$ are modeled as being conditionally independent of one another give that the event is known to be either a true detection or a false alarm. The distribution of each term depends on the identity of the subword unit, $s_i$, and on whether the event is a true detection or a false alarm.

The queries are all represented using a common limited set of subword units, in this version of the system, a set of approximately L=40 English phonemes. Normalization parameters 142 therefore include parameters for 2L distributions, two for each subword unit s, one for a true detection ("Hit"), $P_s(r|Hit)$, and one for a miss (false alarm), $P_s(r|Miss)$.

Each of these distributions that are associated with the subword units is modeled as a Gaussian (Normal) distribution, with the shared variances among the Hit distributions and among the Miss distributions. Specifically, the distributions take the form:

$$P_S(r|Hit) = N(r; \mu_{H,s}, \sigma_H^2)$$

and $$P_S(r|Miss) = N(r; \mu_{M,s}, \sigma_M^2).$$

Therefore normalization parameters 142 include 2L means $\mu_{H,s}$ and $\mu_{M,s}$, and two variances $\sigma_H^2$ and $\sigma_H^2$.

Because of the additive form $R^{(q)} = \sum_{i=1}^{N} r_{s_i}$, and the assumption of conditional independence of the component scores, the distribution of the raw score conditioned on the detection being either a hit of a miss is also Gaussian with a mean than is the sum of the means of the component scores and a variance that is a sum of the variance of the component scores. Specifically, $$P^{(q)}(R^{(q)}|Hit) = N(R^{(q)}; \Sigma_{i=1}^{N} \mu_{H,s_i}, N\sigma_H^2)$$

and similarly $$P^{(q)}(R^{(q)}|Miss) = N(R^{(q)}; \Sigma_{i=1}^{N} \mu_{M,s_i}, N\sigma_M^2).$$

The score normalizer 140 takes as input a raw score $R^{(q)}$ for a query q, which is represented as the sequence of units $s_1, \ldots, s_N$, and outputs a normalized score, which is computed as a probability $\Pr(Hit|R^{(q)})$ based on the normalization parameters. Score normalizer 140 implements a computation based on Bayes' Rule:

$$\Pr(Hit|R^{(q)}) = P^{(q)}(R^{(q)}|Hit)\Pr(Hit)/P^{(q)}(R^{(q)})$$

where $$P^{(q)}(R^{(q)}) = P^{(q)}(R^{(q)}|Hit)\Pr(Hit) + P^{(q)}(R^{(q)}|Miss)(1 - \Pr(Hit))$$

The a priori probability that a detection is a hit, Pr(Hit), is treated as independent of the query. This a priori probability is computed from the relative number of true query events 132 and false alarms 134 is also stored as one of the parameters of normalization parameters 142.

Referring to FIG. 1, the normalization parameter estimator 130 takes as input a number of true hits and their associated raw scores, and a number of false alarms with their raw scores. To handle the unobserved nature of the component score, the normalization parameter estimator uses an interactive parameter estimation approach, which makes use of a Gibbs Sampling technique in the iteration.

Referring to FIGS. 3-9, the normalization parameter estimator 130 makes use of a number of procedures to estimate the parameters $$\Pr(Hit), \{\mu_{H,i}, \mu_{M,i}\}_{i=1,L}, \sigma_H^2, \sigma_M^2:$$

The normalization parameter estimator 130 estimates the parameter Pr(Hit) according to the fraction of the number of true hits to the total number of detections. Alternatively, this parameter is set to quantity that reflects the estimated fraction of events that will be later detected by the word spotting engine on the unknown speech, or set to some other constant according to other criteria, such as by optimizing the quantity to increase accuracy.

The normalization parameter estimator 130 estimates the parameters for the hits, $\{\mu_{H,i}\}_{i=1,L}, \sigma_H^2$ from the set to true hits 132 independently of the corresponding parameters that it estimates from the false alarms 134. For notational simplicity, we drop the subscript H and M in the following discussion, and refer to the entire set of values for either the hits or the misses as $\mu \equiv \{\mu_{\square,i}\}_{i=1,L}$. Similarly, the entire set of queries and their corresponding raw scores are denoted $Q \equiv \{q\}$ and $R \equiv \{R^{(q)}\}$, respectively. (In the discussion below, each element of the sets corresponds to a single instance of a query.)

Figure 3:
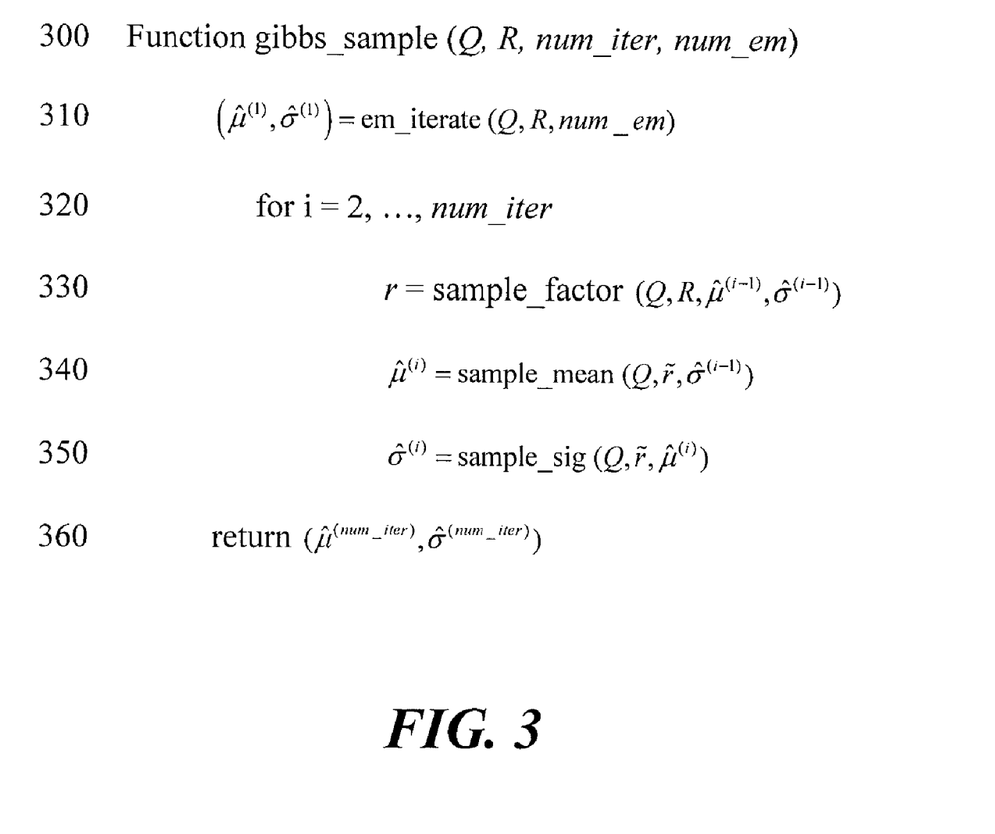
FIGS. 3-9 are pseudocode for a procedures executed in the training component of the word spotting system.

Referring to FIG. 3, the overall parameter estimate procedure to determine $(\hat{\mu}^{(1)}, \hat{\sigma}^{(1)})$ makes use of a Gibbs Sampling approach that is implemented by the function Gibbs_sample() (line 300). (The Gibbs_sample() procedure is called twice, once for the hits, and once for the false alarms.) The first step of the procedure is to determine and estimate of the Maximum Likelihood (ML) estimate of the parameters, which optimally satisfies, $$(\hat{\mu}, \hat{\sigma}) = \arg\max P(R|Q, \mu, \sigma) \, \mu, \sigma$$

A function em_estimate() is executed to yield an approximation $(\hat{\mu}^{(1)}, \hat{\sigma}^{(1)})$ of this ML estimate. The details of this procedure are discussed further below with reference to FIGS. 4-6 that include the pseudocode for the function.

The Gibbs_sample() procedure continues with a three-step interation (lines 320-350). In the first step of the iteration (line 330), a function sample_factor() is used to generate a random sampling of the component scores based on the raw scores for the queries, and the current parameter values. This function yields a set $\{\tilde{r}^{(q)}\}$ with one vector element per query, where $\tilde{r}^{(q)} \equiv (\tilde{r}_1^{(q)}, \ldots, \tilde{r}_N^{(q)})$ is the vector of component scores for query q, and N is the length of the phonetic representation of q. For each of the queries, the component scores are drawn at random constrained to satisfy match the total raw score for the query, $\Sigma_i \tilde{r}_i^{(q)} = R^{(q)}$. The sample_factor() function is described below with reference to FIG. 7.

In the next step of the iteration (line 340), the randomly drawn component scores are used in a function sample_mean() to reestimate the means of the component scores, $\hat{\mu}^{(i)} = (\mu_1^{(i)}, \ldots \mu_L^{(i)})^T$. The sample_mean() is described below with reference to FIG. 8.

In the third and final step of the iteration (line 350), the randomly drawn component scores, and the newly updated means of the distributions of the component scores are used in a function sample_sig() to reestimate the shared standard deviation of the distributions, $\hat{\sigma}^{(i)}$.

After the specified number of iterations (num_iter), the Gibbs_sample() procedure returns the current estimate of the parameters of the distributions for the component scores (line 360).

Figure 4:
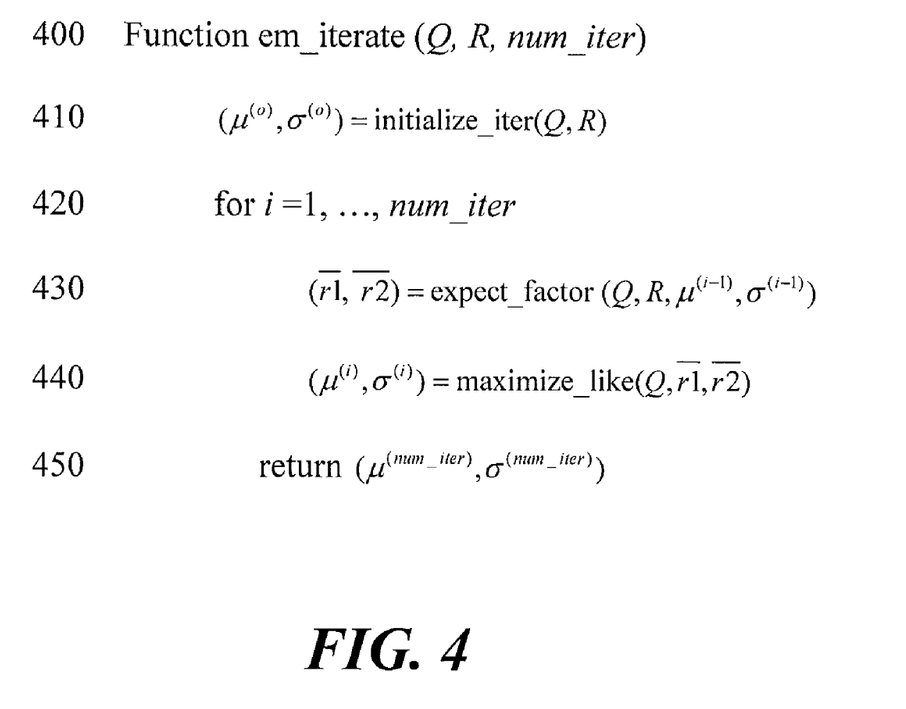

Referring to FIG. 4, the em_iterate() function (line 400) is called from the Gibbs_sample() function. Initial estimates for the parameters are first obtained using a initialize_iter() function (line 410). The procedure is relatively insensitive to this initial estimate, which can, for example, set all the mean parameters to a common shared value.

The em_iterate() makes use of the Estimate-Maximize (EM) algorithm, starting at the initial estimate ($\hat{\mu}^{(0)}, \hat{\sigma}^{(0)}$), and iterating until a stopping condition, in this case the maximum number of iterations num_iter, is reached. Each iteration involves two steps. First, a function expect_factor() (line 430) is used to determine expected values of sufficient statistics for updating the parameter values, and then a function maximize_like() (line 440) uses these expected values to reestimate the parameter values. After the maximum number of iterations is reached, the current estimates of the parameter values are returned as an estimate of the Maximum Likelihood estimate of the parameter values.

Figure 5:
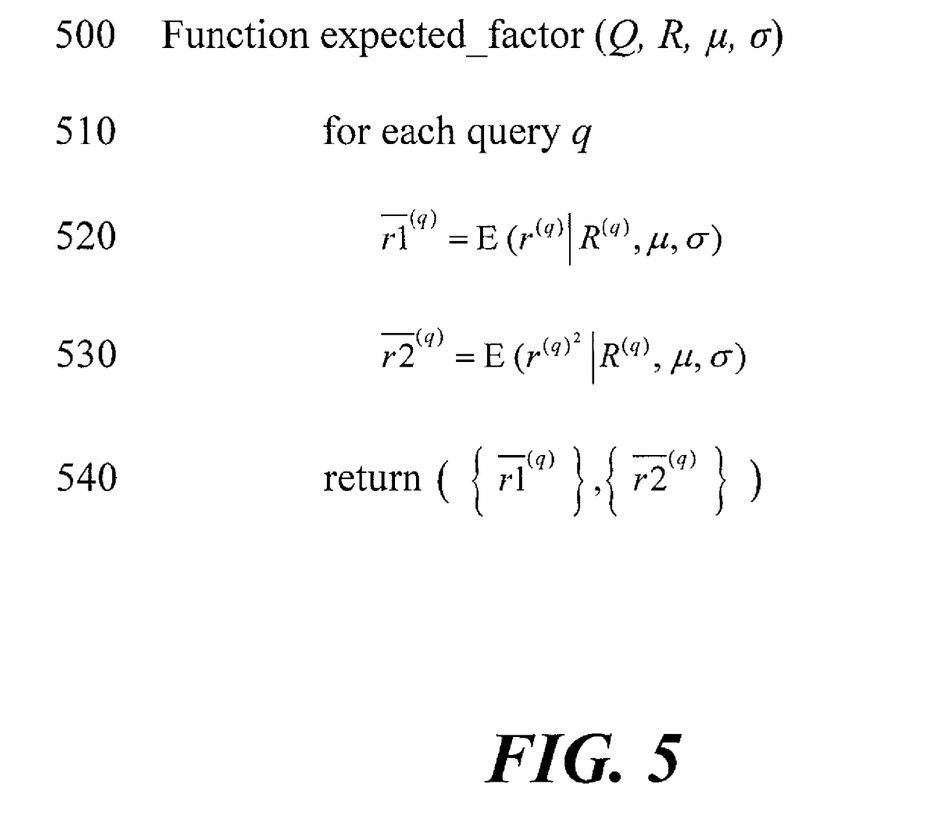

Referring to FIG. 5, the expect_factor() function (line 500) iterates over each of the queries q (lines 510-530). For each query, the function first computes an expected value, $\overline{r1}^{(q)}$, of the vector of component scores $r^{(q)} = (r_1^{(q)}, \ldots, r_N^{(q)})$ for the query, conditioned on the current estimates or the parameter values and on the value of the total raw score, $R^{(q)}$, for the query (line 520). Then the function computes an expected value $\overline{r2}^{(q)}$ of the (element wise) square of the component scores (line 530).

Figure 6:
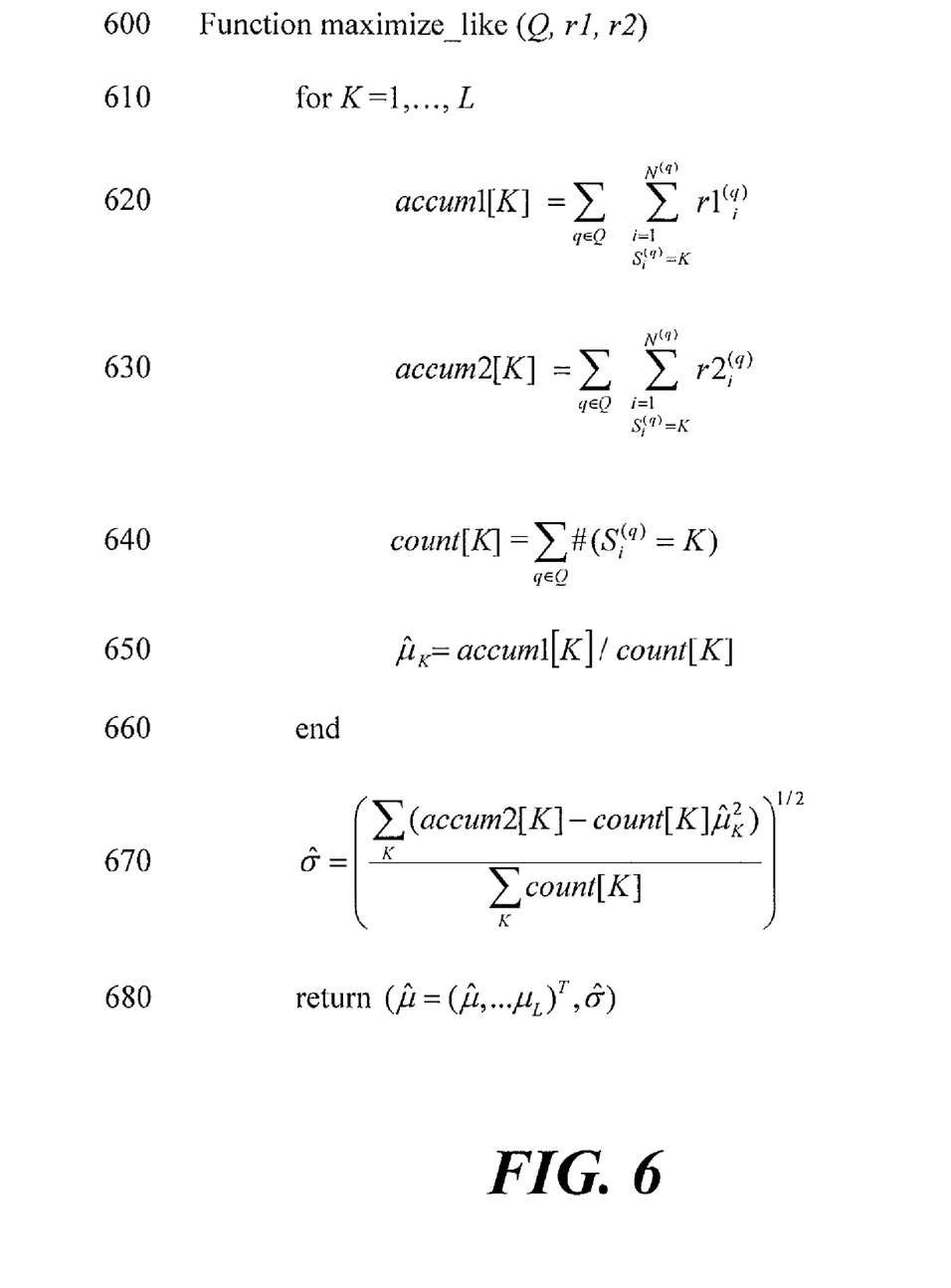

Referring to FIG. 6, the maximize_like() function (line 600) uses the expected values of the sufficient statistics by accumulating, for each phoneme k, a sum of the expected first and second order (squared) statistics corresponding to that phoneme into accum1[k], and accum2[k], respectively (line 620-630), as well as counting the total number of occurrences of that phoneme (line 640). The updated mean for each phoneme, $\hat{\mu}_k$, is computed as the average of the first order statistic (line 650). The updated standard deviation (square root of the variance), $\hat{\sigma}$, is computed based on the accumulated second order statistic and the updated means for the phonemes (line 670). The maximize_like() function then returns the updated mean and standard deviation estimates (line 680).

Figure 7:
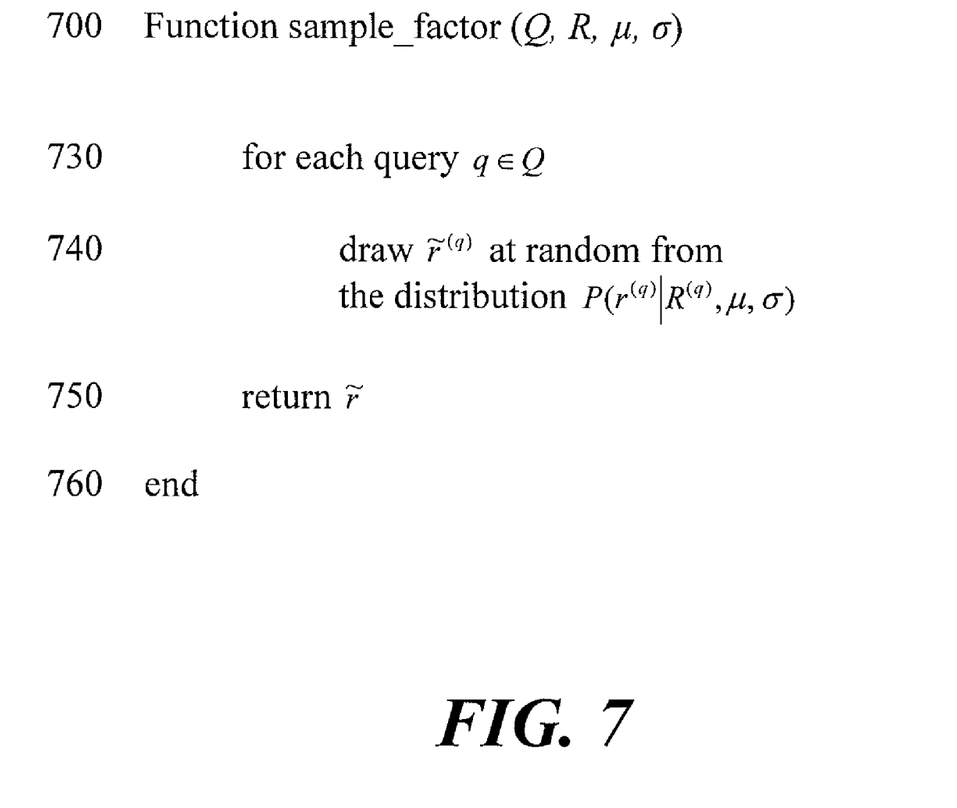

Referring to FIG. 7, the sample_factor() function (line 700) is used in the three-step iteration of the Gibbs_sample() function (see FIG. 4). For each query, q, a vector of component scores $\tilde{r}^{(q)} \equiv (\tilde{r}_1^{(q)}, \ldots, \tilde{r}_N^{(q)})$ is drawn at random from the distribution for those component scores conditioned on the total raw score for the query, $R^{(q)}$, and the current estimates of the mean and standard deviation parameters of the component scores (line 730-740). The set of these random draws, $\tilde{r} = \{\tilde{r}^{(q)}\}$ is returned by the function.

Figure 8:
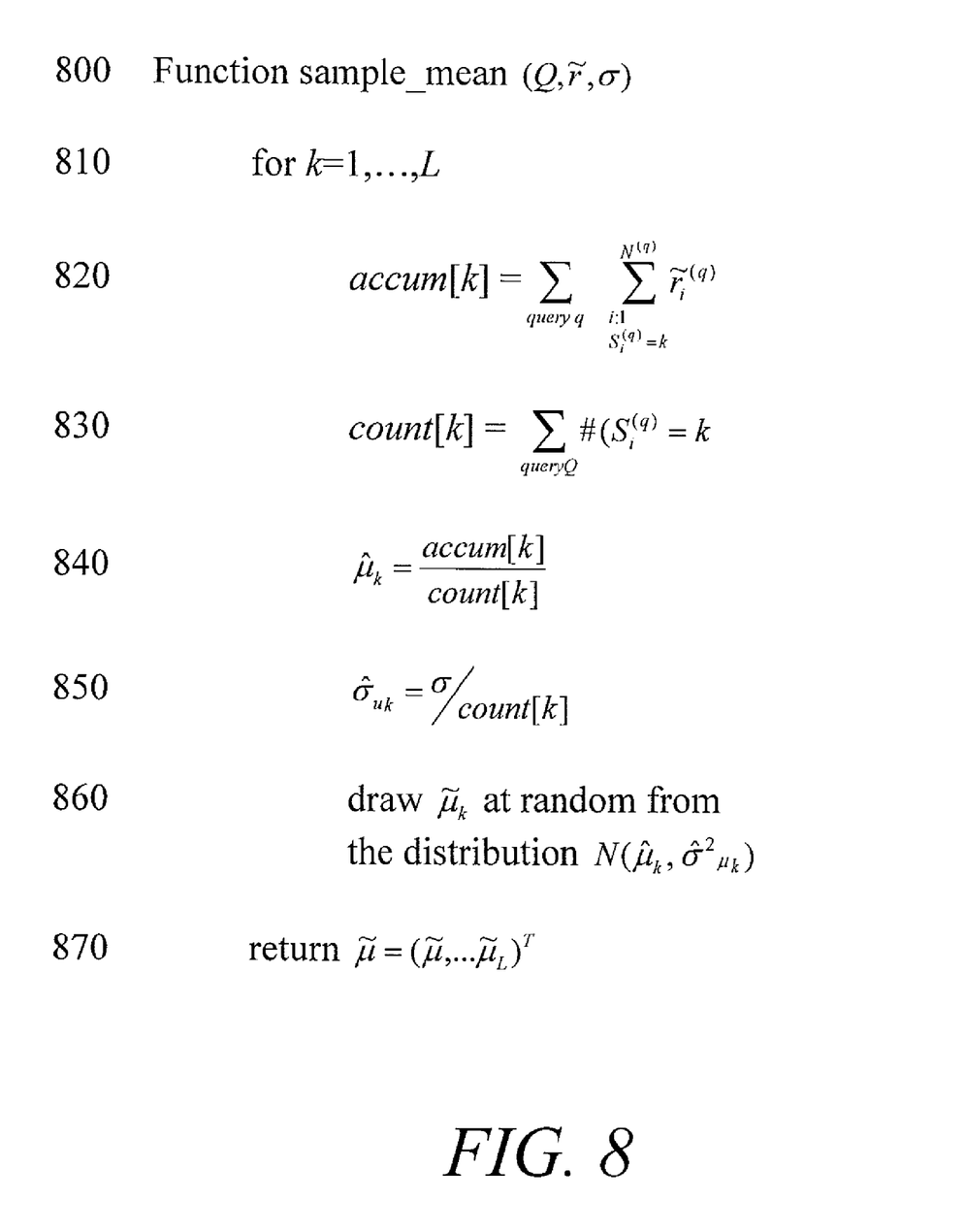

Referring to FIG. 8, the sample_mean() function takes the randomly drawn component scores and computes updated mean parameters for the phonemes by drawing from a normal distribution for each phoneme. For each phoneme, k, the mean of this distribution, $\hat{\mu}_k$, is computed as essentially the average of the corresponding randomly drawn component scores (lines 820-840). The standard deviation of the distribution, $\tilde{\sigma}_k$, is taken to be the current estimate of the standard deviation divided by the number of occurrences of the phoneme (line 850). The updated value of the mean parameter, $\tilde{\mu}_k$, is then drawn at random (line 860). The vector of all the randomly drawn mean parameters is then returned by the function (line 870).

Figure 9:
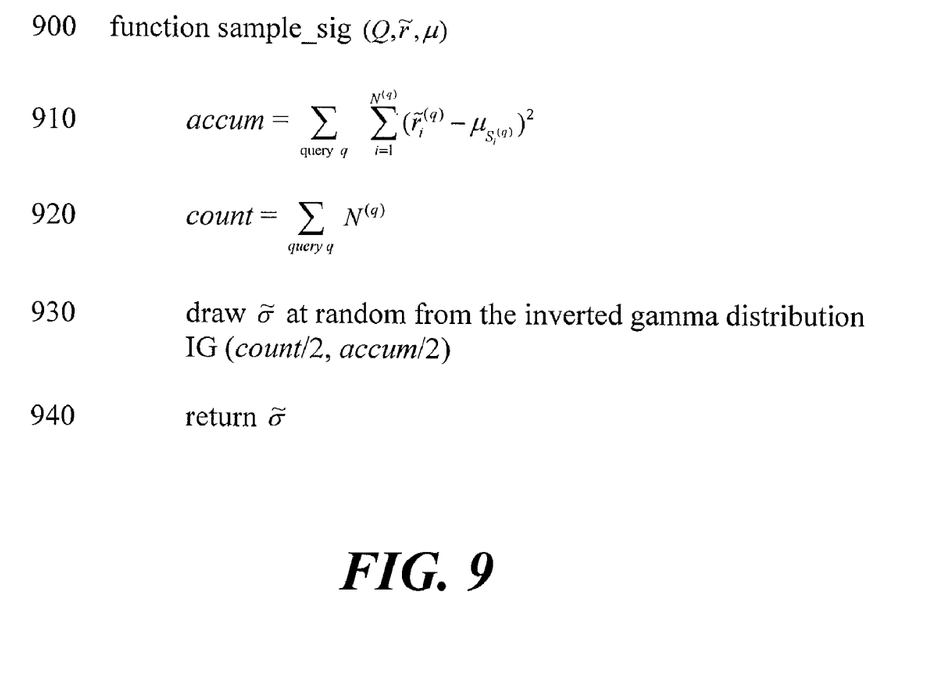

Referring to FIG. 9, the sample_sig() function is used to update the standard deviation of the distributions of the component scores. The standard deviation is drawn from an Inverted Gamma (IG) distribution (line 930). The parameters of the IG function are one half the count of the total number of phonemes in all the queries (line 920), and one half the sum of the squared deviations of the of the randomly drawn component scores, $r_i^{(q)}$ from the means for the corresponding phonemes $s_i^{(q)}$.

In an optional mode, the normalization parameter estimator does not assume that the variances of the component score distributions are tied to a common value, and it independently estimates each variance using a variant of the procedures shown in FIGS. 3-9 and discussed above.

In alternative embodiments, different forms of probability distributions, and different parameter estimation methods are used. These estimates can form Maximum Likelihood (ML), Maximum A Posteriori (MAP), Maximum Mutual Information (MMI), or other types of estimates of the parameter values. Various types of prior distributions of parameter values can be used for those estimation techniques that depend on such prior estimates. Various numerical techniques can also be use to optimize or calculate the parameter values.

In the discussion above, each putative instance of a query is associated with a particular phoneme sequence. In alternative forms of the approach, each query may allow multiple different phoneme sequences, for example to allow alternative pronunciations or alternative word sequences. In this alternative approach, the phoneme sequence associated with an instance of a query (hit or miss) can be treated as unknown or as a random variable, which can have a prior distribution based on the query. Also, as introduced above, the subword units are not necessarily phonemes. Larger linguistic units such as syllables or demi-syllables whole words can be use, as can arbitrary units derived from data. Also, other forms of models, both statistical and non-statistical, can be used by the word spotting engine to locate the putative events with their associated scores.

The system described above can be implemented in software, with instructions stored on a computer-readable medium, such as a magnetic or an optical disk. The software can be executed on different types of processors, including general purpose processors and signal processors. For example, the system can be hosted on a general purpose computer executing the Windows operating system. Some or all of the functional can also be implemented using hardware, such as using ASICs or custom integrated circuits. The system can be implemented on a single computer, or can be distributed over multiple computers. For example, the training subsystem can be hosted on one computer while the runtime component is hosted on another component.

It is to be understood that the foregoing description is intended to illustrate and not to limit the scope of the invention, which is defined by the scope of the appended claims. Other embodiments are within the scope of the following claims.

What is claimed is:

1. A method for processing acoustically-based events according to a predefined plurality of component events, each component event having a recognition model and having corresponding distributions of recognition scores resulting from application of the recognition model to acoustically-based events, the method comprising:
    accepting data characterizing a detected instance of an acoustically-based event that is represented by a set of component events, said data including a first recognition score for said detected instance of the acoustically-based event;
    accepting, for each recognition model of a component event, a plurality of distributions of recognition scores, each distribution of recognition scores for a recognition model being associated with a corresponding different class of a plurality of possible classes, the possible classes including at least a class of true occurrences; and
    scoring the detected instance of the acoustically-based event, including computing a second recognition score for said detected instance of the acoustically-based event using (i) the accepted distributions of recognition scores for the set of component events used to represent the acoustically-based event, and (ii) the first recognition score for the acoustically-based event.

2. The method of claim 1 wherein the possible classes include false detections.

3. The method of claim 1 wherein the acoustically-based event includes a linguistically-defined event.

4. The method of claim 3 wherein the linguistically-defined event includes one or more word events.

5. The method of claim 4 wherein the component events include subword units.

6. The method of claim 5 wherein the subword units include phonemes.

7. The method of claim 1 further comprising accepting data characterizing a plurality of instances of acoustically-based events, at least some of the acoustically-based events being known to belong to each of the possible classes.

8. The method of claim 7 further comprising estimating parameters for the distributions of recognition scores from the data characterizing the plurality of instances of acoustically-based events.

9. The method of claim 8 wherein estimating the parameters includes applying a Gibbs sampling approach.

10. The method of claim 1 wherein scoring the detected instance of the acoustically-based event includes computing the second recognition score to characterize a degree to which the first recognition score is consistent with the distributions for the component events in the true occurrence class.

11. The method of claim 1 wherein scoring the detected instance of the acoustically-based event includes computing the second recognition score to characterize a probability that the detected instance of the acoustically-based event belongs to the true occurrence class.

12. A computer-readable medium comprising instructions for causing a computing system to perform operations for processing acoustically-based events according to a predefined plurality of component events, each component event having a recognition model and having corresponding distributions of recognition scores resulting from application of the recognition model to acoustically-based events, the operations including:
    accepting data characterizing a detected instance of an acoustically-based event that is represented by a set of component events, said data including a first recognition score for said detected instance of the acoustically-based event;
    accepting, for each recognition model of a component event, a plurality of distributions of recognition scores, each distribution of recognition scores for a recognition model being associated with a corresponding different class of a plurality of possible classes, the possible classes including at least a class of true occurrences; and
    scoring the detected instance of the acoustically-based event, including computing a second recognition score for said detected instance of the acoustically-based event using (i) the accepted of recognition scores for the set of component events used to represent the acoustically-based event, and (ii) the first recognition score for the acoustically-based event.

13. A system for processing acoustically-based events according to a predefined plurality of component events, each component event having a recognition model and having corresponding distributions of recognition scores resulting from application of the recognition model to acoustically-based events, the system comprising:
    a first input for accepting data characterizing a detected instance of an acoustically-based event that is represented by a set of component events, said data including a first recognition score for said detected instance of the acoustically-based event;
    storage, for each recognition model of a component event, a plurality of distributions of recognition scores, each distribution of recognition scores for a recognition model being associated with a corresponding different class of a plurality of possible classes, the possible classes including at least a class of true occurrences; and
    a computational component for computing a second recognition score for said detected instance of the acoustically-based event using (i) the accepted distributions for the set of component events used to represent the acoustically-based event, and (ii) the first recognition score for the acoustically-based event; and
    an output for providing the second recognition score for the detected instance of the acoustically-based event.

* * * * *